US007291779B2

(12) United States Patent
Hasebe

(10) Patent No.: US 7,291,779 B2
(45) Date of Patent: Nov. 6, 2007

(54) PERFORMANCE INFORMATION DISPLAY APPARATUS AND PROGRAM

(75) Inventor: Kiyoshi Hasebe, Hamamatsu (JP)

(73) Assignee: Yamaha Corporation (JP)

( * ) Notice: Subject to any disclaimer, the term of this patent is extended or adjusted under 35 U.S.C. 154(b) by 163 days.

(21) Appl. No.: 11/084,603

(22) Filed: Mar. 18, 2005

(65) Prior Publication Data

US 2005/0204901 A1 Sep. 22, 2005

(30) Foreign Application Priority Data

Mar. 18, 2004 (JP) ............................ 2004-079084

(51) Int. Cl.
*G09B 15/00* (2006.01)
*G09B 15/02* (2006.01)
*G10H 1/00* (2006.01)

(52) U.S. Cl. ......................... 84/477 R; 84/609; 84/649

(58) Field of Classification Search ..................... None
See application file for complete search history.

(56) References Cited

U.S. PATENT DOCUMENTS

| | | | | |
|---|---|---|---|---|
| 6,635,816 | B2 * | 10/2003 | Funaki | 84/477 R |
| 2004/0055441 | A1 * | 3/2004 | Katsuta | 84/470 R |
| 2004/0094017 | A1 * | 5/2004 | Suzuki et al. | 84/609 |
| 2004/0177745 | A1 * | 9/2004 | Kayama | 84/609 |

FOREIGN PATENT DOCUMENTS

JP 2002-49371 A 2/2002

* cited by examiner

*Primary Examiner*—Marlon Fletcher
(74) *Attorney, Agent, or Firm*—Rossi, Kimms, McDowell LLP

(57) ABSTRACT

A performance information display apparatus which makes it possible to easily check whether or not automatic performance based on performance data is carried out in accordance with the creator's intention. Performance data includes sounding designation data which designates sounding starting timing and sounding ending timing of each of musical tones constituting a musical composition, and is stored in a performance data storage section 302. A generation time period calculating section 308 calculates a generation time period of a musical tone signal indicative of each of the musical tones corresponding to the sounding designation data in the performance data to be generated by a musical tone generating device when the musical tone generating device is instructed to generate the musical tone signal. A display processing section 304 instructs the display section 305 to display the sounding starting timing and the sounding ending timing designated by the sounding designation data corresponding to at least one of the musical tones constituting the musical composition, and instructs the display section 305 to display at least an end of a generation time period of the musical tone signal indicative of the at least one musical tone calculated by the generation time period calculating section 308.

10 Claims, 17 Drawing Sheets

*FIG. 3*

| NOTE DATA NUMBER | CHANNEL NUMBER | PITCH DESIGNATION DATA | SOUNDING DESIGNATION DATA | | VELOCITY DATA |
|---|---|---|---|---|---|
| | | | NOTE-ON TIMING DATA | NOTE-OFF TIMING DATA | |
| 1 | 1 | C5 | 1:1:001 | 1:1:232 | 52 |
| 2 | 2 | E4 | 1:1:003 | 1:1:471 | 79 |
| 3 | 2 | F3 | 1:1:005 | 1:1:472 | 77 |
| 4 | 2 | A3 | 1:1:232 | 1:2:009 | 40 |
| 5 | 2 | C4 | 1:2:003 | 1:2:246 | 58 |
| 6 | 2 | G3 | 1:2:229 | 1:3:238 | 116 |
| 7 | 2 | F4 | 1:2:242 | 1:3:240 | 113 |
| 8 | 1 | D5 | 1:2:246 | 1:4:007 | 123 |
| 9 | 2 | B3 | 1:2:247 | 1:3:246 | 109 |
| 10 | 2 | G3 | 1:3:241 | 1:3:474 | 38 |
| 11 | 2 | B3 | 1:4:002 | 1:4:250 | 60 |
| 12 | 2 | D4 | 1:4:251 | 1:4:473 | 72 |
| 13 | 1 | B4 | 1:4:472 | 2:1:236 | 60 |
| 14 | 2 | E3 | 1:4:473 | 2:1:234 | 60 |
| 15 | 2 | D4 | 2:1:011 | 2:1:229 | 61 |
| 16 | 2 | A3 | 2:1:237 | 2:2:009 | 37 |
| 17 | 2 | G3 | 2:1:472 | 2:3:012 | 60 |
| 18 | 2 | B3 | 2:2:006 | 2:2:477 | 58 |
| 19 | 2 | D3 | 2:2:245 | 2:3:244 | 112 |
| 20 | 1 | C5 | 2:2:249 | 2:3:473 | 77 |
| 21 | 2 | F3 | 2:2:251 | 2:3:238 | 103 |
| 22 | 2 | F3 | 2:3:242 | 2:4:002 | 69 |
| 23 | 2 | E3 | 2:4:000 | 2:4:248 | 70 |
| 24 | 2 | D3 | 2:4:251 | 3:1:008 | 53 |

*FIG. 4*

| EVENT NUMBER | CHANGING TIMING DATA | CHANNEL NUMBER | TYPE DATA | VALUE DATA | REMARKS DATA |
|---|---|---|---|---|---|
| 1 | 0:1:000 | 1 | TONE COLOR | 74 | FLUTE |
| 2 | 0:1:000 | 2 | TONE COLOR | 2 | PIANO |
| 3 | 0:1:000 | 1 | CHANNEL VOLUME | 98 | |
| 4 | 0:1:000 | 2 | CHANNEL VOLUME | 82 | |
| 5 | 1:1:006 | 1 | EXPRESSION | 85 | |
| 6 | 1:1:130 | 2 | EXPRESSION | 90 | |
| 7 | 1:2:240 | 2 | CHANNEL VOLUME | 64 | |
| 8 | 1:2:244 | 1 | EXPRESSION | 101 | |
| 9 | 1:2:360 | 1 | EXPRESSION | 103 | |
| 10 | 1:3:002 | 2 | EXPRESSION | 97 | |
| 11 | 1:3:123 | 1 | EXPRESSION | 106 | |
| 12 | 1:3:237 | 2 | EXPRESSION | 83 | |
| 13 | 1:3:351 | 1 | EXPRESSION | 109 | |
| 14 | 1:4:360 | 1 | TONE COLOR | 57 | TRUMPET |
| 15 | 1:4:476 | 1 | EXPRESSION | 85 | |
| 16 | 2:1:000 | 1 | CHANNEL VOLUME | 65 | |
| 17 | 2:1:000 | 2 | CHANNEL VOLUME | 105 | |
| 18 | 2:1:111 | 1 | EXPRESSION | 89 | |
| 19 | 2:2:236 | 1 | EXPRESSION | 98 | |
| 20 | 2:2:240 | 2 | CHANNEL VOLUME | 78 | |
| 21 | 2:2:364 | 1 | EXPRESSION | 101 | |
| 22 | 2:2:385 | 2 | EXPRESSION | 115 | |
| 23 | 2:3:120 | 1 | EXPRESSION | 105 | |
| 24 | 2:3:229 | 1 | EXPRESSION | 108 | |
| 25 | 2:3:349 | 1 | EXPRESSION | 109 | |

*FIG. 5*

| EVENT NUMBER | CHANGING TIMING DATA | TYPE DATA | VALUE DATA |
|---|---|---|---|
| 1 | 0:1:000 | BEAT | 4/4 |
| 2 | 0:1:000 | RESOLUTION | 480 |
| 3 | 0:1:000 | TEMPO | 80 |
| 4 | 0:1:000 | MASTER VOLUME | 67 |
| 5 | 1:3:015 | MASTER VOLUME | 80 |
| 6 | 2:1:007 | MASTER VOLUME | 90 |
| 7 | 2:2:315 | MASTER VOLUME | 98 |

FIG. 6
| TONE COLOR NUMBER | ALGORITHM DATA | NUMBER OF OPERATORS | OUTPUT LEVEL PARAMETER GROUP (OPERATOR 1) | | | | | | | | OUTPUT LEVEL PARAMETER GROUP (OPERATOR 2) | ... |
|---|---|---|---|---|---|---|---|---|---|---|---|---|
| | | | TL | SL | AR | DR | SR | RR | KSL | KSR | ... | ... |
| 1 | 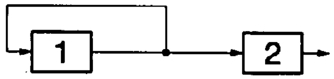 | 2 | 58 | 13 | 12 | 9 | 4 | 8 | 1 | 2 | ... | ... |
| 2 | 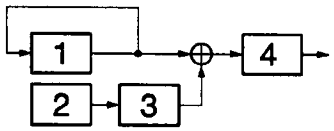 | 4 | 49 | 7 | 8 | 10 | 6 | 13 | 3 | 1 | ... | ... |
| ... | ... | ... | ... | ... | ... | ... | ... | ... | ... | ... | ... | ... |

FIG. 14A

| LINE NUMBER | NOTE DATA NUMBER | NOTE-ON/ SOUND-OFF | NUMBER OF OPERATORS | TIMING DATA | SOUNDING NOTE NUMBER | TOTAL NUMBER OF OPERATORS |
|---|---|---|---|---|---|---|
| 1 | 1 | NOTE-ON | 2 | 1:1:001 | 1 | 2 |
| 2 | 2 | NOTE-ON | 4 | 1:1:003 | 1,2 | 6 |
| 3 | 3 | NOTE-ON | 4 | 1:1:005 | 1,2,3 | 10 |
| 4 | 4 | NOTE-ON | 4 | 1:1:232 | 1,2,3,4 | 14 |
| 5 | 1 | SOUND-OFF | (2) | 1:1:408 | 2,3,4 | 12 |
| 6 | 5 | NOTE-ON | 4 | 1:2:003 | 2,3,4,5 | 16 |
| 7 | 3 | SOUND-OFF | (4) | 1:2:112 | 2,4,5 | 12 |
| 8 | 4 | SOUND-OFF | (4) | 1:2:176 | 2,5 | 8 |
| 9 | 2 | SOUND-OFF | (4) | 1:2:200 | 5 | 4 |
| 10 | 6 | NOTE-ON | 4 | 1:2:229 | 5,6 | 8 |
| 11 | 7 | NOTE-ON | 4 | 1:2:242 | 5,6,7 | 12 |
| 12 | 8 | NOTE-ON | 2 | 1:2:246 | 5,6,7,8 | 14 |
| 13 | 9 | NOTE-ON | 4 | 1:2:247 | 5,6,7,8,9 | 18 |
| 14 | 5 | SOUND-OFF | (4) | 1:2:432 | 6,7,8,9 | 14 |
| 15 | 6 | SOUND-OFF | (4) | 1:3:241 | 7,8,9 | 10 |
| 16 | 10 | NOTE-ON | 4 | 1:3:241 | 7,8,9,10 | 14 |
| 17 | 9 | SOUND-OFF | (4) | 1:3:384 | 7,8,10 | 10 |
| 18 | 7 | SOUND-OFF | (4) | 1:3:432 | 8,10 | 6 |
| 19 | 11 | NOTE-ON | 4 | 1:4:002 | 8,10,11 | 10 |
| 20 | 10 | SOUND-OFF | (4) | 1:4:192 | 8,11 | 6 |
| 21 | 8 | SOUND-OFF | (2) | 1:4:200 | 11 | 4 |
| 22 | 12 | NOTE-ON | 4 | 1:4:251 | 11,12 | 8 |
| 23 | 11 | SOUND-OFF | (4) | 1:4:416 | 12 | 4 |

FIG. 14B

| | | | | | | |
|---|---|---|---|---|---|---|
| 24 | 13 | NOTE-ON | 4 | 1:4:472 | 12,13 | 8 |
| 25 | 14 | NOTE-ON | 4 | 1:4:473 | 12,13,14 | 12 |
| 26 | 15 | NOTE-ON | 4 | 2:1:011 | 12,13,14,15 | 16 |
| 27 | 12 | SOUND-OFF | (4) | 2:1:011 | 13,14,15 | 12 |
| 28 | 16 | NOTE-ON | 4 | 2:1:237 | 13,14,15,16 | 16 |
| 29 | 15 | SOUND-OFF | (4) | 2:1:384 | 13,14,16 | 12 |
| 30 | 13 | SOUND-OFF | (4) | 2:1:408 | 14,16 | 8 |
| 31 | 14 | SOUND-OFF | (4) | 2:1:424 | 16 | 4 |
| 32 | 17 | NOTE-ON | 4 | 2:1:472 | 16,17 | 8 |
| 33 | 18 | NOTE-ON | 4 | 2:2:006 | 16,17,18 | 12 |
| 34 | 16 | SOUND-OFF | (4) | 2:2:176 | 17,18 | 8 |
| 35 | 19 | NOTE-ON | 4 | 2:2:245 | 17,18,19 | 12 |
| 36 | 20 | NOTE-ON | 4 | 2:2:249 | 17,18,19,20 | 16 |
| 37 | 21 | NOTE-ON | 4 | 2:2:251 | 17,18,19,20,21 | 20 |
| 38 | 18 | SOUND-OFF | (4) | 2:3:152 | 17,19,20,21 | 16 |
| 39 | 17 | SOUND-OFF | (4) | 2:3:168 | 19,20,21 | 12 |
| 40 | 22 | NOTE-ON | 4 | 2:3:242 | 19,20,21,22 | 16 |
| 41 | 21 | SOUND-OFF | (4) | 2:3:242 | 19,20,22 | 12 |
| 42 | 19 | SOUND-OFF | (4) | 2:3:360 | 20,22 | 8 |
| 43 | 23 | NOTE-ON | 4 | 2:4:000 | 20,22,23 | 12 |
| 44 | 22 | SOUND-OFF | (4) | 2:4:176 | 20,23 | 8 |
| 45 | 20 | SOUND-OFF | (4) | 2:4:224 | 23 | 4 |
| 46 | 24 | NOTE-ON | 4 | 2:4:251 | 23,24 | 8 |
| 47 | 23 | SOUND-OFF | (4) | 2:4:392 | 24 | 4 |
| 48 | 24 | SOUND-OFF | (4) | 3:1:184 | - | 0 |

FIG. 15A

| LINE NUMBER | NOTE DATA NUMBER | NOTE-ON/ SOUND-OFF | NUMBER OF OPERATORS | TIMING DATA | SOUNDING NOTE NUMBER | TOTAL NUMBER OF OPERATORS |
|---|---|---|---|---|---|---|
| 1 | 1 | NOTE-ON | 2 | 1:1:001 | 1 | 2 |
| 2 | 2 | NOTE-ON | 4 | 1:1:003 | 1,2 | 6 |
| 3 | 3 | NOTE-ON | 4 | 1:1:005 | 1,2,3 | 10 |
| 4 | 4 | NOTE-ON | 4 | 1:1:232 | 1,2,3,4 | 14 |
| 5 | 1 | SOUND-OFF | (2) | 1:1:408 | 2,3,4 | 12 |
| 6 | 5 | NOTE-ON | 4 | 1:2:003 | 2,3,4,5 | 16 |
| 7 | 3 | SOUND-OFF | (4) | 1:2:112 | 2,4,5 | 12 |
| 8 | 4 | SOUND-OFF | (4) | 1:2:176 | 2,5 | 8 |
| 9 | 2 | SOUND-OFF | (4) | 1:2:200 | 5 | 4 |
| 10 | 6 | NOTE-ON | 4 | 1:2:229 | 5,6 | 8 |
| 11 | 7 | NOTE-ON | 4 | 1:2:242 | 5,6,7 | 12 |
| 12 | 8 | NOTE-ON | 2 | 1:2:246 | 5,6,7,8 | 14 |
| 14 | 5 | SOUND-OFF | (4) | 1:2:247 | 6,7,8 | 10 |
| 13 | 9 | NOTE-ON | 4 | 1:2:247 | 6,7,8,9 | 14 |
| 15 | 6 | SOUND-OFF | (4) | 1:3:241 | 7,8,9 | 10 |
| 16 | 10 | NOTE-ON | 4 | 1:3:241 | 7,8,9,10 | 14 |
| 17 | 9 | SOUND-OFF | (4) | 1:3:384 | 7,8,10 | 10 |
| 18 | 7 | SOUND-OFF | (4) | 1:3:432 | 8,10 | 6 |
| 19 | 11 | NOTE-ON | 4 | 1:4:002 | 8,10,11 | 10 |
| 20 | 10 | SOUND-OFF | (4) | 1:4:192 | 8,11 | 6 |
| 21 | 8 | SOUND-OFF | (2) | 1:4:200 | 11 | 4 |
| 22 | 12 | NOTE-ON | 4 | 1:4:251 | 11,12 | 8 |
| 23 | 11 | SOUND-OFF | (4) | 1:4:416 | 12 | 4 |

FIG. 15B

| | | | | | | |
|---|---|---|---|---|---|---|
| 24 | 13 | NOTE-ON | 4 | 1:4:472 | 12,13 | 8 |
| 25 | 14 | NOTE-ON | 4 | 1:4:473 | 12,13,14 | 12 |
| 26 | 15 | NOTE-ON | 4 | 2:1:011 | 12,13,14,15 | 16 |
| 27 | 12 | SOUND-OFF | (4) | 2:1:011 | 13,14,15 | 12 |
| 28 | 16 | NOTE-ON | 4 | 2:1:237 | 13,14,15,16 | 16 |
| 29 | 15 | SOUND-OFF | (4) | 2:1:384 | 13,14,16 | 12 |
| 30 | 13 | SOUND-OFF | (4) | 2:1:408 | 14,16 | 8 |
| 31 | 14 | SOUND-OFF | (4) | 2:1:424 | 16 | 4 |
| 32 | 17 | NOTE-ON | 4 | 2:1:472 | 16,17 | 8 |
| 33 | 18 | NOTE-ON | 4 | 2:2:006 | 16,17,18 | 12 |
| 34 | 16 | SOUND-OFF | (4) | 2:2:176 | 17,18 | 8 |
| 35 | 19 | NOTE-ON | 4 | 2:2:245 | 17,18,19 | 12 |
| 36 | 20 | NOTE-ON | 4 | 2:2:249 | 17,18,19,20 | 16 |
| 39 | 17 | SOUND-OFF | (4) | 2:2:251 | 18,19,20 | 12 |
| 37 | 21 | NOTE-ON | 4 | 2:2:251 | 18,19,20,21 | 16 |
| 38 | 18 | SOUND-OFF | (4) | 2:3:152 | 19,20,21 | 12 |
| 40 | 22 | NOTE-ON | 4 | 2:3:242 | 19,20,21,22 | 16 |
| 41 | 21 | SOUND-OFF | (4) | 2:3:242 | 19,20,22 | 12 |
| 42 | 19 | SOUND-OFF | (4) | 2:3:360 | 20,22 | 8 |
| 43 | 23 | NOTE-ON | 4 | 2:4:000 | 20,22,23 | 12 |
| 44 | 22 | SOUND-OFF | (4) | 2:4:176 | 20,23 | 8 |
| 45 | 20 | SOUND-OFF | (4) | 2:4:224 | 23 | 4 |
| 46 | 24 | NOTE-ON | 4 | 2:4:251 | 23,24 | 8 |
| 47 | 23 | SOUND-OFF | (4) | 2:4:392 | 24 | 4 |
| 48 | 24 | SOUND-OFF | (4) | 3:1:184 | - | 0 |

PERFORMANCE INFORMATION DISPLAY APPARATUS AND PROGRAM

BACKGROUND OF THE INVENTION

1. Field of the Invention

The present invention relates to a technique of displaying performance data, and more particularly to a performance information display apparatus and program.

2. Description of the Related Art

There has been a technique of causing an automatic performance apparatus to carry out automatic performance of a musical composition using performance data including plural pieces of note data indicative of pitch, sounding time period, etc. of musical tones constituting the musical composition. In general, an apparatus called an authoring tool is used to display and edit the contents of performance data used for the automatic performance apparatus.

FIG. 17 is a view showing how the contents of performance data are displayed by the authoring tool. The display format shown in FIG. 17 is generally referred to as piano-roll format in which a bar-shaped figure called a note bar indicates the contents of each piece of note data included in performance data. In the piano-roll format, the vertical direction as viewed in FIG. 17 corresponds to a pitch axis, and the horizontal direction corresponds to a time axis. For example, a note bar 1801 in FIG. 17 represents note data which indicates that a musical tone whose pitch is C3 is sounded from the 1.5th beat to the 3rd beat of the first bar. In the authoring tool capable of displaying note data in the piano-roll format, the user changes the position and length of a note bar by dragging a predetermined position thereof using a mouse pointer so as to change the contents of note data.

The above-mentioned piano-roll format is disclosed in e.g. Japanese Laid-Open Patent Publication (Kokai) No. 2002-49371.

By the way, the number of musical tones which can be sounded at the same time by the automatic performance apparatus is limited by processor capability, memory capacity, data bus data transfer capacity, etc. of the automatic performance apparatus (hereinafter referred to as "resources") (hereinafter the upper limit of the number of musical tones will be referred to as "the maximum number of tones that can be sounded"). Upon reception of an instruction for sounding musical tones in number greater than the maximum number of musical tones that can be sounded, the automatic performance apparatus usually stops sounding only a musical tone of which sounding was started at the earliest among the musical tones of a musical composition being sounded, and allocates resources which have been used for sounding the musical tone to sounding of musical tones which are newly instructed to be sounded. The technique of sequentially allocating limited resources to sounding of different musical tones as above is called "DVA" (Dynamic Voice Allocation).

According to the DVA, it is possible to prevent the problem that a following musical tone is not sounded in the case where all the resources are used for sounding a preceding musical tone. However, if sounding of a preceding musical tone is forced to be stopped so as to sound a following musical tone, performance may become unnatural. For example, there may be a case where sounding of a musical tone in a melody part is stopped so as to sound a musical tone in an accompaniment part. To address this problem, the creator of performance data checks whether or not an instruction for sounding musical tones in number greater than the maximum number of musical tones that can be sounded is included in performance data, and e.g. erases less important musical tones as the need arises.

However, both ends of a note bar in the direction of the time axis, which is displayed in the piano-roll format by the authoring tool, indicate note-on timing and note-off timing of corresponding note data, and usually, the sounding time period of a musical tone indicated by the note bar does not correspond to the actual sounding time period of a musical tone sounded by the automatic performance apparatus for reasons stated below.

Taking an example where piano keys are operated, the note-on timing and the note-off timing correspond to timing in which a key is depressed and timing in which a finger is released from the depressed key, respectively. A musical tone sounded by a piano usually includes a reverberant part which is sounded even after a finger is released from the key (hereinafter referred to as "the release part"). This also applies to musical instruments other than a piano. Thus, many of automatic performance apparatuses are adapted to continue sounding the release part for a while even after the note-off timing. The duration of the release part differs according to tone color, pitch, tone intensity, and so forth.

For example, in FIG. 17, the note-off timing of note data corresponding to the note bar 1801 is the third beat of the first bar, but there is the possibility that a musical tone sounded by the automatic performance apparatus according to this note data is continuously sounded even after the third beat of the first bar.

As stated above, the time period between the note-on timing and the note-off timing displayed by the authoring tool does not correspond to the sounding time period of a musical tone which is actually sounded, and hence the creator of performance data has to repeatedly edit and reproduce the performance data so as to check whether or not sounding is to be interrupted against his/her intention. For example, in FIG. 17, there is no overlap between the time period indicated by the note bar 1801 and the time period indicated by a note bar 1802. However, there is the possibility that sounding of the release part of a musical tone sounded according to the note bar 1801 is stopped so as to sound a musical tone according to the note bar 1802, and the creator cannot recognize this without reproducing performance data. It should be noted that many authoring tools are capable of displaying performance data in a staff format, a list format, and so forth other than the piano-roll format, and the above described problem applies to any of these display formats.

SUMMARY OF THE INVENTION

It is an object of the present invention to provide a performance information display apparatus and program that makes it possible to easily check whether or not automatic performance based on performance data is carried out in accordance with the creator's intention.

To attain the above object, in a first aspect of the present invention, there is provided a performance information display apparatus comprising a performance data storage device that stores performance data including sounding designation data that designates sounding starting-timing and sounding ending timing of each of musical tones constituting a musical composition, a generation time period calculating device that calculates a generation time period of a musical tone signal indicative of each of the musical tones corresponding to the sounding designation data in the performance data to be generated by a musical tone generating device when the musical tone generating device is instructed to generate the musical tone signal, and a display device that provides first display indicative of the sounding starting timing and the sounding ending timing designated by the sounding designation data corresponding to at least one of the musical tones constituting the musical composition, and provides second display indicative of at least an end of a generation time period of the musical tone signal indicative of the at least one musical tone calculated by the generation time period calculating device.

According to the performance information display apparatus constructed as above, the user can easily check the contents of performance data and at the same time check the actual sounding time period of a musical tone sounded according to the performance data.

Preferably, the performance data further includes volume designation data that designates a temporal change in volume of each of the musical tones constituting the musical composition, and the generation time period calculating device calculates the generation time period of the musical tone signal indicative of the at least one musical tone according to the volume designation data corresponding to the at least one musical tone.

According to the performance information display apparatus constructed as above, even in the case where data which designates a temporal change in the volume of a musical tone is included in performance data, the user can easily check the contents of the performance data and at the same time check the actual sounding time period of a musical tone sounded according to the performance data.

Preferably, the display device provides the second display by displaying an envelope indicative of a temporal change in volume of the at least one musical tone.

According to the performance information display apparatus constructed as above, the user can easily check the volume at which a musical tone sounded according to performance data is to be sounded at different time points.

Preferably, the performance information display apparatus further comprises a required resource amount calculating device that calculates an amount of resources required for generating the musical tone signal indicative of each of the musical tones corresponding to the sounding designation data in the performance data based on the generation time period of the musical tone signal indicative of each of the musical tones calculated by the generation time period calculating device, and a shortage time period calculating device that calculates a time period for which the amount of resources based on the generation time period of the musical tone signal indicative of each of the musical tones calculated by the required resource amount calculating device exceeds an amount of resources owned by the musical tone generating device, as a resource shortage time period, the display device displays the resource shortage time period calculated by the shortage time period calculating device.

According to the performance information display apparatus constructed as above, the user can easily check the degree to which the generation time period of a musical tone instructed to be sounded by performance data exceeds the sounding capability of the musical tone generating device.

Also preferably, the generation time period of the musical tone signal calculated by the generation time period calculating device includes a generation time period of a reverberant part of a corresponding musical tone.

To attain the above object, in a second aspect of the present invention, there is provided a performance information display apparatus comprising a performance data storage device that stores performance data including sounding designation data that designates sounding starting timing and sounding ending timing of each of musical tones constituting a musical composition, a generation time period calculating device that calculates a generation time period of a musical tone signal indicative of each of the musical tones corresponding to the sounding designation data in the performance data to be generated by a musical tone generating device when the musical tone generating device is instructed to generate the musical tone signal, a required resource amount calculating device that calculates an amount of resources required for generating the musical tone signal indicative of each of the musical tones corresponding to the sounding designation data in the performance data based on the generation time period of the musical tone signal indicative of each of the musical tones calculated by the generation time period calculating device, a shortage time period calculating device that calculates a time period for which the amount of resources based on the generation time period of the musical tone signal indicative of each of the musical tone calculated by the required resource amount calculating device exceeds an amount of resources owed by the musical tone generating device, as a resource shortage time period, and a display device that displays the resource shortage time period calculated by the shortage time period calculating device.

Preferably, the musical tone generating device comprises a musical tone generating device based on an FM tone generator method, and the resources are operators comprising the musical tone generating device based on the FM tone generator method.

To attain the above object, in a third aspect of the present invention, there is provided a program executed by a computer comprising a performance data storage module for storing performance data including sounding designation data that designates sounding starting timing and sounding ending timing of each of musical tones constituting a musical composition, a generation time period calculating module for calculating a generation time period of a musical tone signal indicative of each of the musical tones corresponding to the sounding designation data in the performance data to be generated by a musical tone generating device when the musical tone generating device is instructed to generate the musical tone signal, and a display module for providing first display indicative of the sounding starting timing and the sounding ending timing designated by the sounding designation data corresponding to at least one of the musical tones constituting the musical composition, and providing second display indicative of at least an end of a generation time period of the musical tone signal indicative of the at least one musical tone calculated by the generation time period calculating module.

According to the program configured as above, the user can realize a performance information display apparatus which makes it possible to easily check the contents of performance data and at the same time check the actual sounding time period of a musical tone sounded according to the performance data.

To attain the above object, in a fourth aspect of the present invention, there is provided a program executed by a computer comprising a performance data storage module for storing performance data including sounding designation data that designates sounding starting timing and sounding ending timing of each of musical tones constituting a musical composition, a generation time period calculating module for calculating a generation time period of a musical tone signal indicative of each of the musical tones corresponding to the sounding designation data in the performance data to be generated by a musical tone generating device when the musical tone generating device is instructed to generate the musical tone signal, a required resource amount calculating module for calculating an amount of resources required for generating the musical tone signal indicative of each of the musical tones corresponding to the sounding designation data in the performance data based on the generation time period of the musical tone signal indicative of each of the musical tones calculated by the generation time period calculating module, a shortage time period calculating module for calculating a time period for which r the amount of resources based on the generation time period of the musical tone signal indicative of each of the musical tone calculated by the required resource amount calculating module exceeds an amount of resources owed by the musical tone generating device, as a resource shortage time period, and a display module for displaying the resource shortage time period calculated by the shortage time period calculating module.

As described above, according to the present invention, the creator of performance data can easily check the actual sounding time period of a musical tone sounded according to performance data by the automatic performance apparatus. Therefore, the creator of performance data can easily check whether or not automatic performance based on performance data is carried out according to his/her intention. As a result, it is possible to solve the problem that the automatic performance apparatus does not carry out performance as intended by the creator of the performance data.

The above and other objects, features, and advantages of the invention will become more apparent from the following detailed description taken in conjunction with the accompanying drawings.

BRIEF DESCRIPTION OF THE DRAWINGS

FIG. 3 is a diagram showing note data of performance data which is processed by the authoring tool;

FIG. 4 is a diagram showing channel event data of the performance data;

FIG. 5 is a diagram showing song event data of the performance data;

FIG. 6 is a diagram showing tone color data which is stored in a tone color data storage section appearing in FIG. 2;

FIGS. 14A and 14B are view showing an example of a sound interruption detecting data list generated by the authoring tool;

FIGS. 15A and 15B are view showing an example of an update version of a sound interruption detecting data list generated by the authoring tool;

DETAILED DESCRIPTION OF THE PREFERRED EMBODIMENTS

The present invention will now be described in detail with reference to the drawings showing a preferred embodiment thereof.

Figure 1:
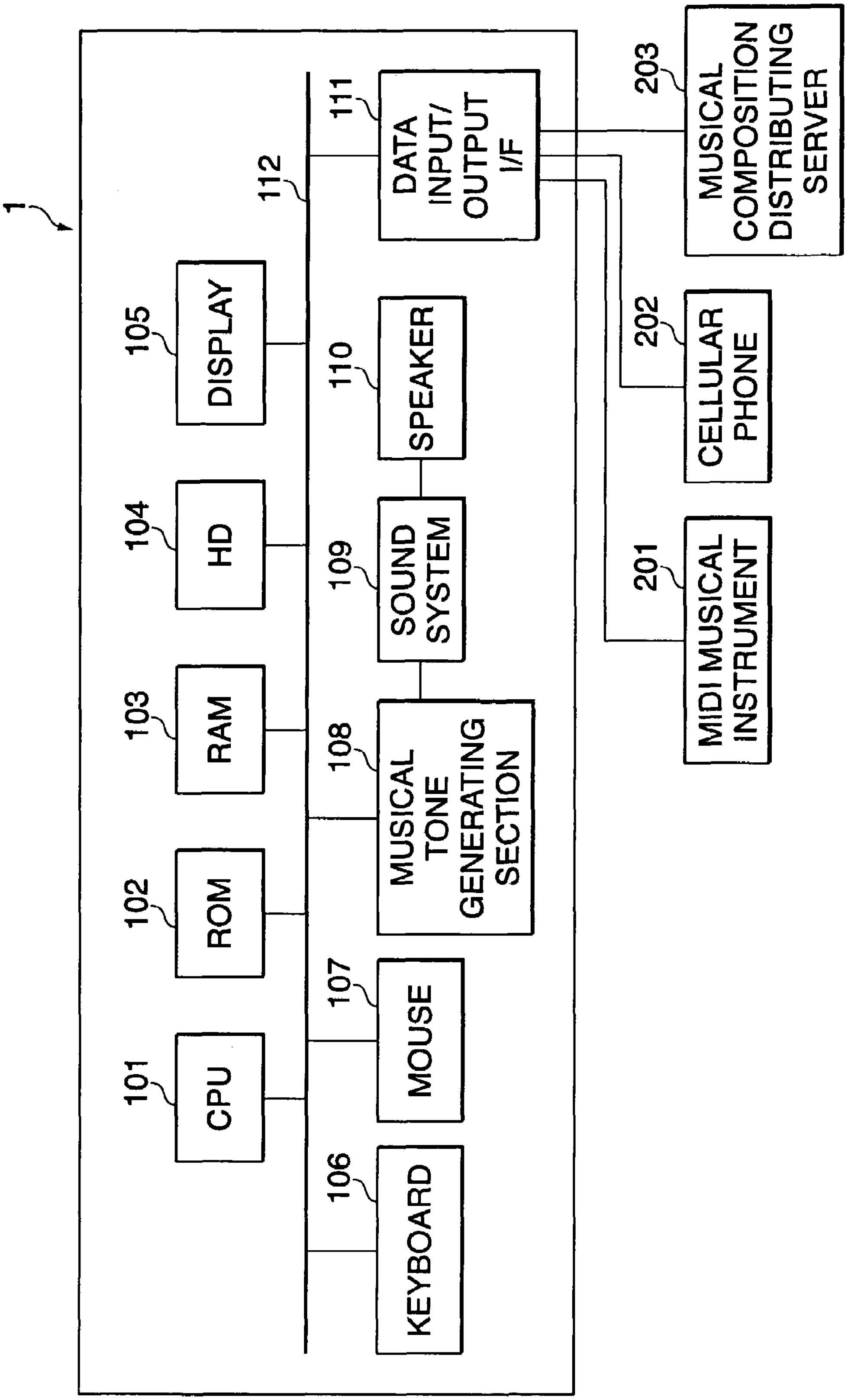
FIG. 1 is a block diagram showing the construction of a computer which realizes an authoring tool as a performance information display apparatus according to an embodiment of the present invention.

FIG. 1 is a block diagram showing the construction of a computer 1 that realizes an apparatus (hereinafter referred to as "the authoring tool") 10 which has a performance information display function and edits and reproduces performance data, as a performance information display apparatus according to an embodiment of the present invention. As is the case with an ordinary computer, the computer 1 is comprised of a CPU (Central Processing Unit) 101, a ROM (Read Only Memory) 102, a RAM (Random Access Memory) 103, an HD (Hard Disk) 104, a display 105, a keyboard 106, and a mouse 107. It should be noted that the computer 1 is provided with an oscillator, not shown, so that the CPU 101, a musical tone generating section 108, a sound system 109, and so forth can precisely calculate the period of time elapsed after a reference time point and perform synchronization processing between component parts by acquiring a common clock signal from the oscillator.

The computer 1 is further comprised of the musical tone generating section 108 as a DSP (Digital Signal Processor) which generates digital audio data which represents information on musical tones, the sound system 109 which is provided with a D/A (Digital-to-Analog) converter, an amplifier, and so forth, for converting digital audio data generated by the musical tone generating section 108 into an analog audio signal and outputs the same, a speaker 110 which sounds an analog audio signal output from the sound system 109 as musical tones, and a data input/output I/F (Interface) 111 which sends and receives data to and from various external apparatuses.

The musical tone generating section 108 operates in response to an instruction from the CPU 101 to generate digital audio data which represents various musical tones using tone color data such as waveform data and tone color parameter data stored in the HD 104 and others. The musical tone generating section 108 is capable of generating digital audio data using various methods such as an FM (Frequency Modulation) tone generator method, a PCM (Pulse Code Modulation) tone generator method, and a physical model tone generator method according to the contents of an instruction from the CPU 101 and the contents of tone color data stored in the HD 104 and others. In the following description, however, it is assumed that the musical tone generating section 108 generates digital audio data using the FM tone generator method. The musical tone generating section 108 is provided with up to 16 operators, and generates one musical tone using two or four of the operators.

The data input/output IF 111 is provided with I/F functions conforming to various data transmission standards of a MIDI (Musical Instrument Digital Interface), a USB (Universal Serial Bus), a wired LAN (Local Area Network), and a wireless LAN, and so forth. FIG. 1 shows an example of the state in which a MIDI musical instrument 201, a cellular phone 202, and a musical composition distributing server 203 are connected to the data input/output I/F 111. In the computer 1, the component parts other than the sound system 109 and the speaker 110 are connected to each other via a bus 112 so that data can be sent and received to and from each other.

Figure 2:
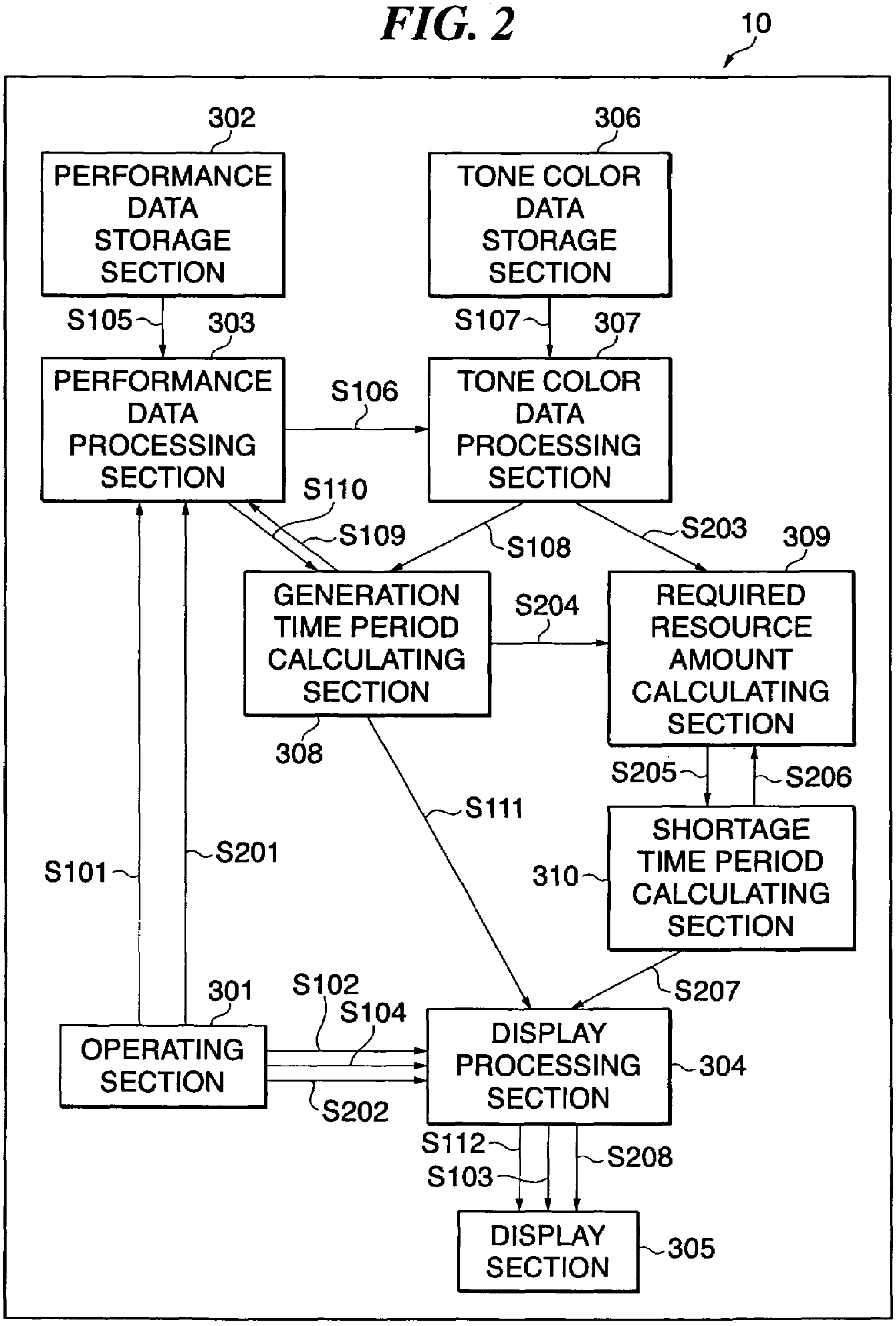
FIG. 2 is a block diagram showing the functional arrangement of the authoring tool appearing in FIG. 1.

The CPU 101 executes specific applications stored in the HD 104 to function as the authoring tool 10 according to the present embodiment. FIG. 2 is a block diagram showing the functional arrangement of the authoring tool 10. It should be noted that the functional arrangement of the authoring tool 10 relating to the edition and reproduction of performance data is identical with that of an ordinary authoring tool, and is therefore not illustrated in FIG. 2.

An operating section 301 is implemented by the keyboard 106 and the mouse 107, and is used for the user to give an instruction to the authoring tool 10. A performance data storage section 302 and a tone color data storage section 306, which are implemented by the ROM 102 or the HD 104, store performance data and tone color data, respectively.

The performance data is comprised of note data which gives an instruction for sounding each musical tone, channel event data which gives an instruction for changing the volume and so forth of musical tones of each musical instrument part, and song event data which gives an instruction for changing the volume and so forth of all the musical tones. It should be noted that, in general, the word "channel" refers to each of a plurality of groups formed by classifying performance data, and one musical instrument part should not necessarily be associated with one channel, but in the following description, channels and musical instrument parts one-to-one correspond to each other.

FIG. 3 is a diagram showing an example of note data included in the performance data, which is displayed in a list format. Note data in each line of the list includes a note data number for identifying the note data, a channel number indicative of a channel to which a musical tone of the note data belongs, pitch designation data indicative of the pitch of the musical tone, sounding instruction data indicative of the time period for which the musical tone is instructed to be sounded, and velocity data indicative of the intensity i.e. velocity of the musical tone. The sounding instruction data is comprised of note-on timing data indicative of note-on timing of the musical tone, and note-off timing data indicative of note-off timing of the musical tone.

The pitch instruction data is realized by a combination of an alphabet, a symbol, and a numeric value such as "C2", "D#4", and "B♭3". The sounding instruction data indicates note-on timing and note-off timing using a combination of three numeric values indicative of a bar number, a beat number, and timing in a beat corresponding to the beat number. For example, the note-on timing data of note data with a note-data number "1" (hereinafter referred to as "note data 1"), shown in FIG. 3, is represented by "1:1:001" indicative of timing one unit time after the top of the first beat of the first bar. Here, the unit time means a time period which is calculated by dividing one minute by a value obtained by multiplying resolution and tempo designated by song event data, described later. It should be noted that in the list, plural pieces of note data are arranged in the order of note-on timing from the earliest to the latest. The velocity data is represented by any of integers 0 to 127, and a greater numeric value indicates a higher intensity of a musical tone. The velocity data is a sort of volume designation data which designates the volume of a musical tone; one piece of velocity data is given to each musical tone.

FIG. 4 is a diagram showing an example of channel event data included in the performance data, which is displayed in a list format. Channel event data in each line of the list includes an event number for identifying the channel event data, changing timing data indicative of timing in which e.g. the volume is changed, a channel number indicative of a channel for which a changing instruction is given, type data indicative of the contents of the changing instruction, value data indicative of a value of volume or the like after change, and remarks data indicative of the contents indicated by the value data as text. The format of changing timing data is the same as that of the above-mentioned note-on timing data.

In the present embodiment, three kinds of type data consisting of "channel volume", "expression", and "tone color" are used. The "channel volume" and the "expression" indicate that the concerned channel event data is data which gives an instruction for changing the volume on a channel-by-channel basis. The channel event data whose type data is the "channel volume" or the "expression" is a sort of volume designation data which designates the volume of musical tones on a channel-by-channel basis; the "expression" is different from the "channel volume" because the "expression" is mainly used for partial musical expression such as intonation. In the case where the type data is the "channel volume" or the "expression", the value data assumes any of integers 0 to 127 indicative of the volume after change, and a greater value indicates a higher volume of a musical tone. The channel event data whose type data is the "tone color" is tone color designation data which gives an instruction for designating or changing a tone color, and the value data thereof assumes any of integers 1 to 128 corresponding to respective tone colors. In this case, the name of a tone color corresponding to the value data is given as the remarks data. It should be noted that in the list, plural pieces of channel event data are arranged in the order of changing timing from the earliest to the latest.

FIG. 5 is a diagram showing an example of song event data included in the performance data, which is displayed in a list format. Song event data in each line of the list includes an event number for identifying the song event data, changing timing data indicative of timing in which e.g. the volume is changed, type data indicative of the contents of a changing instruction, and value data indicative of a value of e.g. volume after change. The format of the changing timing data is the same as that of the above-mentioned note-on timing data. In the present embodiment, four kinds of type data of the song event data i.e. "beat", "resolution", "tempo", and "master volume" are used. The "beat" indicates that the concerned song event data is data which gives an instruction for designating or changing the beat of a musical composition. The "resolution" indicates that the concerned song event data is data which gives an instruction for designating or changing the number of unit times included in one beat. The "tempo" indicates that the concerned song event data is data which gives an instruction for designating or changing the tempo of a musical composition by means of the number of beats in one minute.

The song event data whose type data is the “beat”, “resolution”, or “tempo” is data which is used for determining various kinds of timing in a musical composition, and will hereafter be referred to as “the timing basic data”. The “master volume” indicates that the concerned song event data is data which gives an instruction for designating or changing the volume of the entire musical composition. The song event data whose type data is the “master volume” is a sort of volume designation data, and the value data thereof assumes any of integers 0 to 127 indicative of the volume as is the case with the velocity data.

FIG. 6 is a diagram showing an example of tone color data stored in the tone color data storage section 306, which is displayed in a list format. Tone color data in each line of the list includes a tone color number for identifying the tone color data, algorithm data indicative of the signal input/output relationship between operators i.e. an algorithm, the number of operators required for executing the algorithm indicated by the algorithm data, and an output level parameter group as a parameter group for identifying temporal changes in the output levels of the operators.

Tone color numbers one-to-one correspond to value data of channel event data whose type data is the “tone color” (see FIG. 4); for example, tone color data with a tone color number “74” (hereinafter referred to as “the tone color data 74”) is indicative of the tone color of a flute. Each box in the algorithm data indicates an operator. For example, in an algorithm of tone color data 1, an operator 2 indicates a carrier, and an operator 1 indicates a modulator which performs modulation on the operator 2. It should be noted that the contents of an algorithm indicated by algorithm data is the same as that of an ordinary FM tone generator, and therefore description thereof is omitted.

The number of operators is 2 or 4. The tone color data includes an output level parameter group in association with each of operators 1 and 2 if the number of operators is 2, or in association with each of operators 1 to 4 if the number of operators is 4. The output level parameter group includes a parameter group for determining the basic form of an envelope indicative of a temporal change in output level (hereinafter referred to as “the ADSR envelope”) and a parameter group for correcting the basic form of the ADSR envelope according to the pitch.

Figure 7:
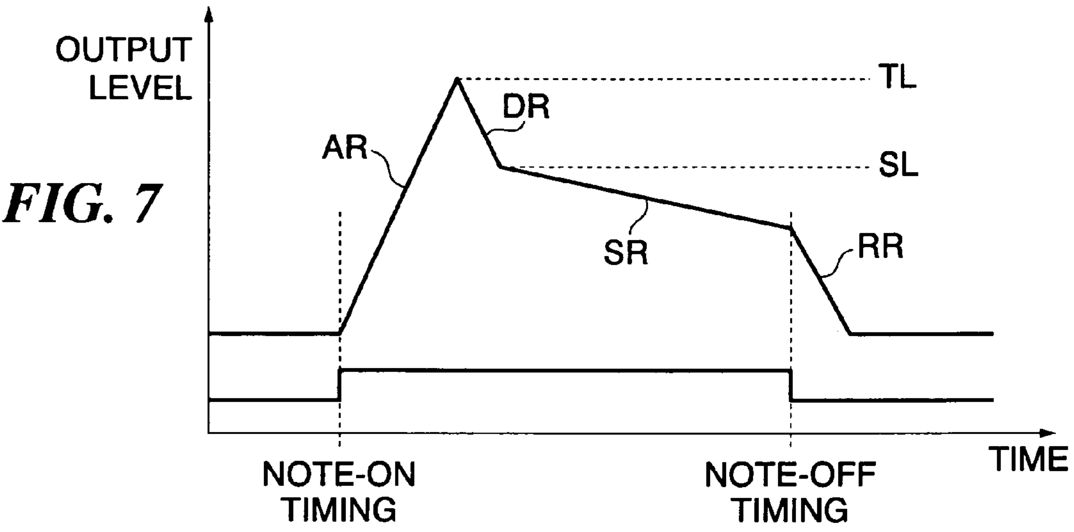
FIG. 7 is a diagram showing the basic form of an ADSR envelope, which is determined by output parameters in the tone color data in FIG. 6.

A total level TL, a sustain level SL, an attack rate AR, a decay rate DR, a sustain rate SR, and a release rate RR are parameters for determining the basic form of the ADSR envelope. FIG. 7 is a diagram showing the basic form of the ADSR envelope determined by the parameters; the ordinate indicates time, and the abscissa indicates the output level. The total level TL and the sustain level SL represent the output level, and the attack rate AR, the decay rate DR, the sustain rate SR, and the releases rate RR represent absolute values of the rate of temporal change in output level (hereinafter referred to as “the rate”). It should be noted that FIG. 6 shows an example of data in the case where the total level TL assumes any of integers 0 to 63, and the sustain level SL, the attack rate AR, the decay rate DR, the sustain rate SR, and the release rate RR are any of integers 0 to 15. The greater the values of those parameters, the higher the rate.

Figure 8:
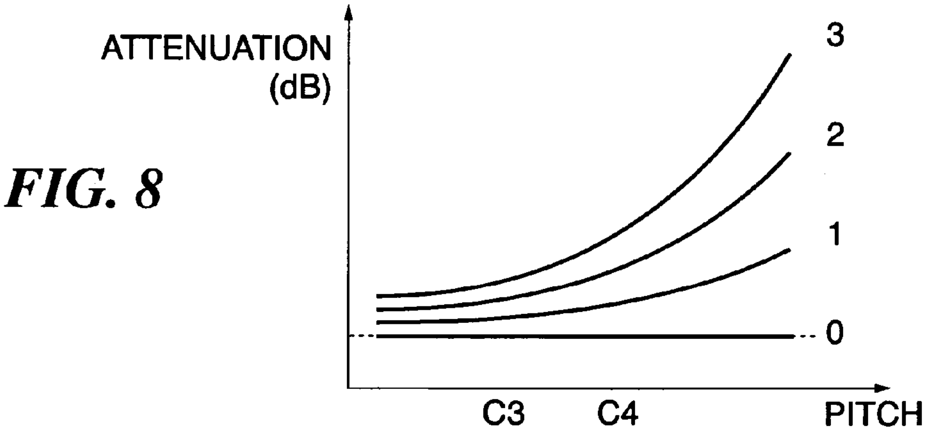
FIG. 8 is a graph which schematically shows the relationship between the pitch and output level attenuation according to a level key scale in the tone color data.
Figure 9:
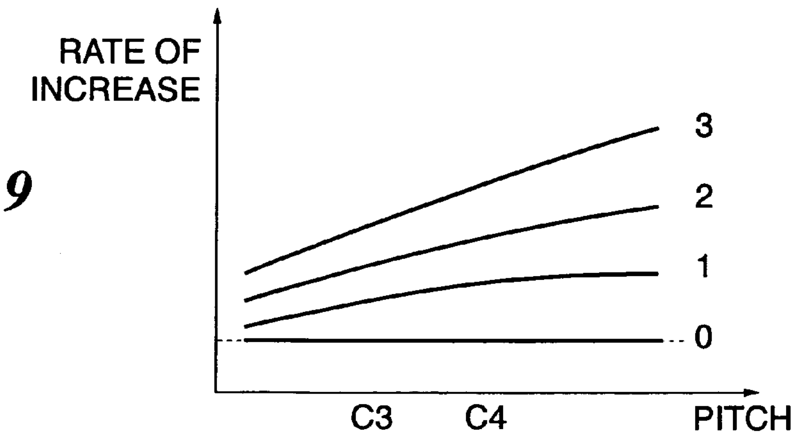
FIG. 9 is a graph which schematically shows the relationship between the pitch and an increase rate of "rate" (absolute value of the rate of temporal change in output level) according to a rate key scale in the tone color data.

A level key scale KSL and a rate key scale kSR included in the output level parameter group are parameters for correcting the basic form of the ADSR envelope according to the pitch. Usually, as the pitch of a musical tone generated by a musical instrument becomes higher, the level of the musical tone lowers and a temporal change in the level becomes faster. The level key scale KSL is a parameter which designates the degree of change in the case where the level of the ADSL envelope is changed according to a change in pitch, and assumes any of integers 0 to 3. FIG. 8 is a graph schematically showing an example of the state in which the relationship between the pitch and output level attenuation (dB) is changed according to values of the level key scale KSL. In FIG. 8, the abscissa indicates the pitch, and the ordinate indicates the output level attenuation. Similarly, the rate key scale KSL is a parameter which designates the degree of change in the case where the rate of the ADSL envelope is changed according to a change in pitch, and assumes any of integers 0 to 3. FIG. 9 is a graph schematically showing an example of the state in which the relationship between the pitch and the increase rate of the rate (absolute value of the rate of temporal change in output level) is changed according to values of the level key scale KSL. In FIG. 9, the abscissa indicates the pitch, and the ordinate indicate the rate of increase.

It should be noted that parameters relating to each operator are not limited to the above-mentioned output level parameter group; for example, they may include parameters relating to the application of acoustic effects such as vibrate. Also, it should be noted that in the following description, it is assumed that the waveform of a signal output from each operator is always a sinusoidal wave, and the degree of feedback modulation is fixed at n/4, and hence, tone color data does not include parameters relating to the waveform and the degree of feedback modulation, but such parameters may be included in tone color data.

Referring again to FIG. 2, a further description will be given of the component parts of the authoring tool 10. A performance data processing section 303 and a tone color data processing section 307 are implemented by the CPU 101 and the RAM 103 used as a working area for the CPU 101, and respectively read out performance data and tone color data from the performance data storage section 302 and the tone color storage section 306 and perform necessary processing on the readout data and output the resulting data.

A generation time period calculating section 308 is implemented by the CPU 101, the musical tone generating section 108, and the RAM 103 used as a working area for them. The generation time period calculating section 308 generates generation period data indicative of a generation time period of digital audio data indicative of a musical tone generated according to the performance data by the musical tone generating section 108, i.e. a time period for which a musical tone is actually sounded, based upon performance data and tone color data. A required resource amount calculating section 309 is implemented by the CPU 101 and the RAM 103 used as a working area for the CPU 101, for calculating the amount of resources required for sounding a musical tone using tone color data and the generation time period data. A shortage time period calculating section 310 is also implemented by the CPU 101 and the RAM 10 used as a working area for the CPU 101, for comparing the amount of resources required for sounding a musical tone and the amount of resources owned by the musical tone generating section 108 to calculate a time period for which a musical tone to be sounded is not sounded due to the shortage of resources, and generating the result as shortage time period data and reduced time period data.

A display processing section 304 is implemented by the CPU 101 and the RAM 103 used as a working area for the CPU 101, for generating image data used for displaying the contents of generation time period data, shortage time period data, and reduced time period data as well as the contents of performance data. A display section 305 is implemented by the display 105, for displaying a screen based on image data generated by the display processing section 304.

The functions of the component parts of the above described authoring tool 10 and the way of using each piece of data will be explained in the following description of operation so as to avoid duplicate explanation. It should be noted that in the present embodiment, as described above, the authoring tool 10 is realized by an application being executed by the computer 1, may be realized by dedicated hardware configured by a combination of e.g. processors capable of executing the respective functions of the component parts appearing in FIG. 2.

Figure 10:
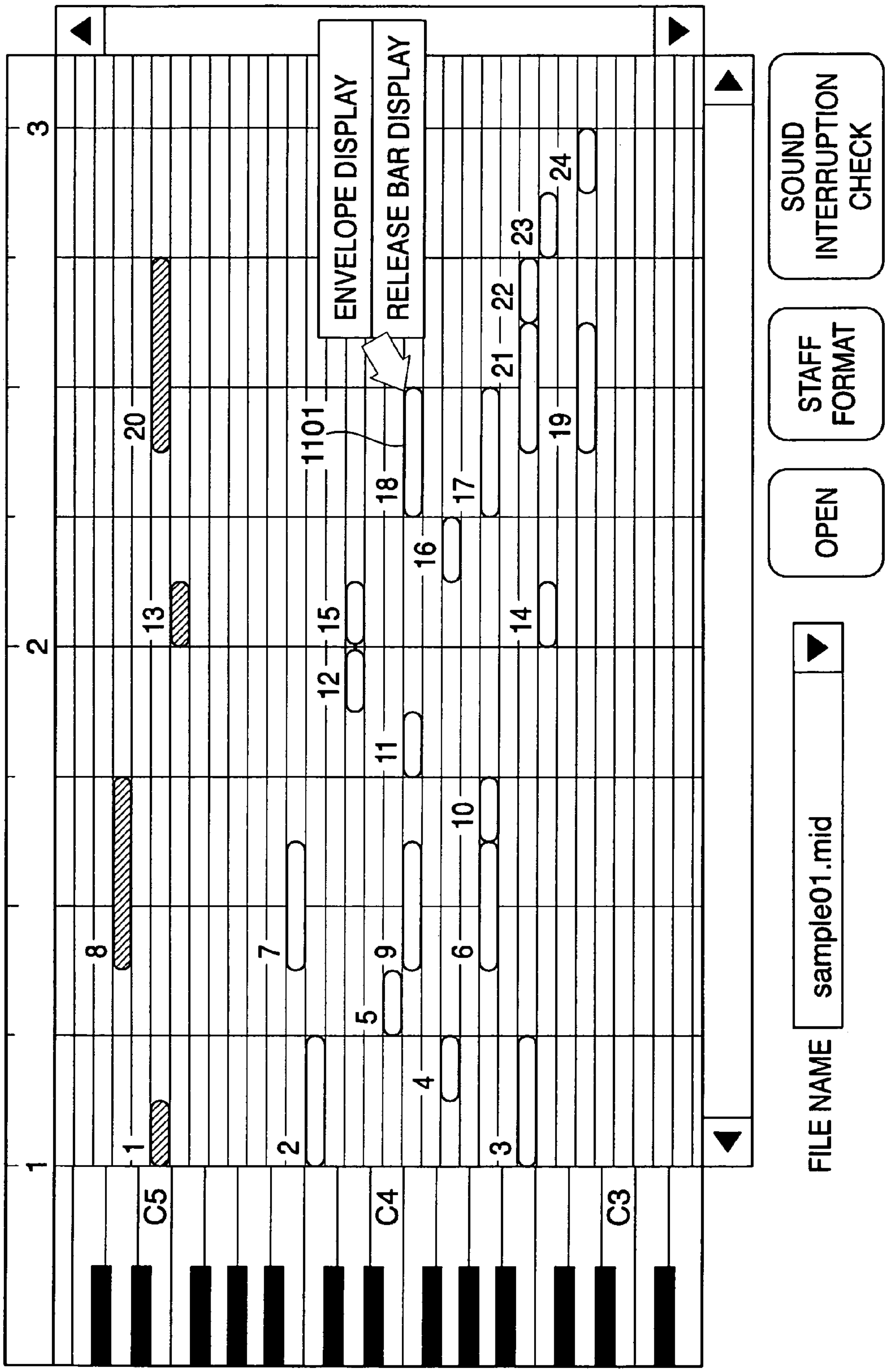
FIG. 10 is a view showing an example of a screen which is displayed in a display section of the authoring tool.

FIG. 10 is a diagram showing an example of a screen displayed in which performance data exemplified in FIGS. 3, 4, and 5 is displayed in a piano-roll format in the display section 305 of the authoring tool 10. In FIG. 10, however, only information relating to pitch designation data and sounding designation data among performance data is displayed. Also, in FIG. 10, a number displayed above each note bar indicates a note data number of note data corresponding to each note bar, and should not necessarily be displayed on the actual screen. Also, in FIG. 10, note bars indicative of note data in a channel 1 are displayed in black, and note bars indicative of note data in a channel 2 are displayed in white. The user can display the contents of desired performance data in the piano-roll format by inputting a file name of the performance data into a "file name" field at the bottom of the screen and then clicking an "open" button. Also, the user can display the contents of the same performance data in a staff format (musical score format) by clicking a "staff display" button.

The performance data processing section 303 and the display processing section 304 temporarily store data indicative of the relationship between display positions of note bars or musical notes and note data, the relationship between display positions of command buttons and functions thereof, and so forth. In the case where performance data is displayed by the display section 305, when the user clicks a specific note bar or command button, note data and functions designated by the user can be identified based on positional data indicative of the position of the note bar or command button. Such operations as display of performance data by the authoring tool 10 are the same as those of the prior art, and therefore description thereof is omitted.

As is distinct from the conventional authoring tool, the authoring tool 10 has a function of displaying the actual sounding time period for which the musical tone generating section 108 sounds a musical tone according to note data designated by the user (hereinafter referred to as "the sounding time period displaying function"). Referring next to FIG. 2, a description will be given of an operation in the case where the authoring tool 10 executes the sounding time period displaying function.

For example, in the case where the user would like to know the actual sounding time period of a musical tone corresponding to a note bar 1101 appearing in FIG. 10, he/she right-clicks the note bar 1101. In response to this user's operation, the operating section 301 sends positional data indicative of the position of the right-clicked note bar 1101 to the performance data processing section 303 and the display processing section 304 (steps S101 and S102). Based upon the received positional data, the display processing section 304 instructs the display section 305 to display a popup menu including options "envelope display" and "release bar display" in the vicinity of the note bar 1101 (step S103).

Figure 11:
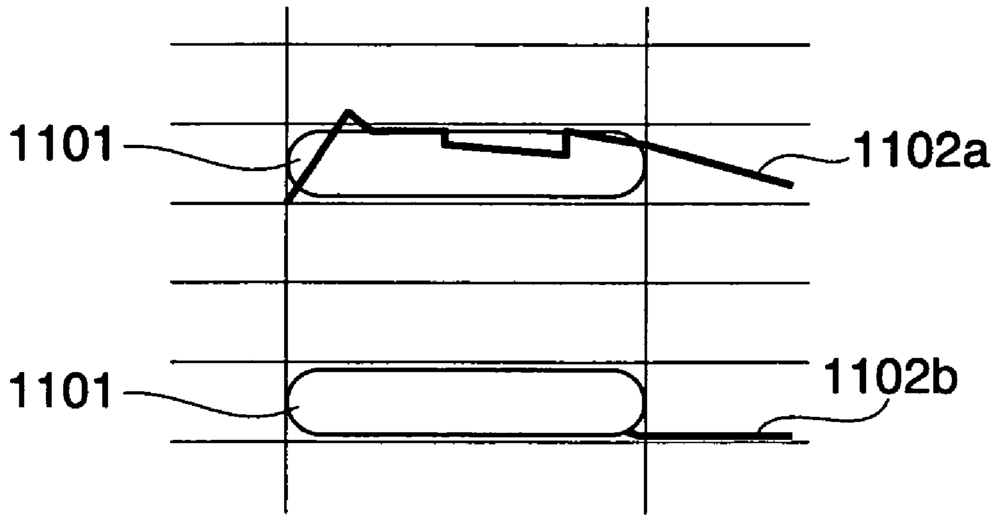
FIG. 11 is a view showing an example of the display mode of sounding time periods displayed in the display section of the authoring tool.

Here, the envelope display means a mode in which an envelope indicating the waveform of a musical tone is displayed as shown in the upper part of FIG. 11. On the other hand, the release bar display means a mode in which a line indicating the duration of the release part of a musical tone (hereinafter referred to as "the release bar") is displayed as shown in the lower part of FIG. 11.

The display section 305 displays the popup menu shown in FIG. 10 in accordance with the instruction from the display processing section 304. When the user performs operation to select the "envelope display" or the "release bar display" from the popup menu, the operating section 301 sends positional data indicative of the position of the selected option to the display processing section 304 (step S104). The display processing section 304 identifies which one of the "envelope display" and the "release bar display" has been selected by the user, based on the received positional data, and temporarily stores selection result data indicative of the result of the selection made by the user.

On the other hand, the performance data processing section 303, which has received the positional data indicative of the position of the note bar 1101 in the step S101, ascertains that note data 18 has been selected, based on the received positional data. The performance data processing section 303 reads out performance data from the performance data storage section 302 (step S105), and identifies the following data included in the note data 18 (see FIG. 3) in the readout performance data:

<Pitch Designation Data: "B3">

<Sounding Designation Data: Note-on Timing "2:2:006">

<Sounding Designation Data: Note-off Timing "2:2:477">

Next, the performance data processing section 303 identifies tone color designation data corresponding to the note data 18, based on a channel number "2" and the note-on timing "2:2:006" included in the note data 18. Specifically, the performance data processing section 303 retrieves data whose channel number is "2", type data is the "tone color", and timing indicated by changing timing data is prior to "2:2:006" and the latest from the channel event data (see FIG. 4). As a result, the performance data processing section 303 identifies the following data:

<Tone Color Designation Data: "2">

Further, the performance data processing section 303 retrieves data whose type data is the "beat", the "resolution", or the "tempo", i.e. which has timing basic data in which timing indicated by changing timing data is prior to "2:2:006" and the latest (default value) and between "2:2:006" and "2:2:477" from the song event data (see FIG. 5), based on note-on timing data "2:2:006" and note-off timing data "2:2:477" included in the note data 18. As a result, the performance data processing section 303 identifies the following data as timing basic data corresponding to the note data 18:

<Timing Basic Data: Beat "4/4" (Default Value)>

<Timing Basic Data: Resolution "480" (Default Value)>

<Timing Basic Data: Tempo "80" (Default Value)>

After identifying the pitch designation data, the sounding designation data, the tone color designation data, and the timing basic data in the above-described manner, the performance data processing section 303 sends the identified data as well as a note data number "18" identifying note data corresponding to the note bar 1101 to the tone color data processing section 307.

Upon reception of the pitch designation data, etc., the tone color data processing section 307 reads out tone color data 2 (refer to FIG. 6) from the tone color data storage section 306 according to the received tone color designation data "2" (step S107). Next, with respect to each operator indicated by the tone color data 2, the tone color data processing section 307 identifies the attenuation of output level corresponding to the received pitch designation data "B3", based on the relationship between the pitch and the attenuation of output level according to the value of the level key scale KSL (see FIG. 8). The tone color data processing section 307 temporarily stores data indicative of the identified attenuation of output level (hereinafter referred to as "the attenuation data").

Similarly, with respect to each operator indicated by the tone color data 2, the tone color data processing section 307 identifies the increase rate of the rate corresponding to the received pitch designation data "B3", based on the relationship between the pitch and the increase rate of the rate of ADSR envelope according to the value of the rate key scale KSR (see FIG. 9). The tone color data processing section 307 temporarily stores data indicative of the identified increase rate of the rate (hereinafter referred to as "the increase rate data").

Upon completion of the above processing, the tone color data processing section 307 sends the algorithm data and the output level parameter group relating to each operator (except for the level key scale KSL and the rate key scale KSR), which are included in the tone color data 2, and the temporarily stored attenuation data and increase rate data as well as the previously received note data number, pitch designation data, sounding designation data, and timing basic data to the generation time period calculating section 308 (step S108). It should be noted that the pitch designation data, the sounding designation data, and the timing basic data should not necessarily be sent from the tone color data processing section 307 to the generation time period calculating section 308 in the step S108, but may be sent from the performance data processing section 303 to the generation time period calculating section 308 at the same time as processing in the step S106.

Upon reception of data such as the algorithm data and the output level parameter group, the generation time period calculating section 308 generates waveform data indicative of a musical tone based on the received data. First, with respect to each operator indicated by the algorithm data, the generation time period calculating section 308 calculates the level by subtracting the attenuation indicated by the attenuation data from the output level indicated by the total level TL and the sustain level SL. Then, the generation time period calculating section 308 increases the rate indicated by the attack rate AR, decay rate DR, sustain rate SR, and release rate RR by the rate of increase indicated by the increase rate data.

The generation time period calculating section 308 generates the ADSR envelope based on the output level parameter group corrected by the attenuation data and the increase rate data as mentioned above according to the note-on timing and the note-off timing indicated by the sounding designation data as reference timing. On this occasion, the generation time period calculating section 308 identifies the note-on timing and the note-off timing using the previously received timing basic data. The generation time period calculating section 308 changes the output level of each operator indicated by the algorithm data in terms of time according to the generated ADSR envelope so as to output waveform data obtained by adding temporal changes in volume and tone color to a sine wave generated by the carrier. On this occasion, the frequency of the sine wave generated by each operator is determined according to the pitch indicated by the pitch designation data. The waveform data generated based on the ADSR envelope in the above-described manner will hereafter be referred to as "the standard waveform data".

Next, the generation time period calculating section 308 generates an envelope of the generated standard waveform data (hereinafter referred to as "the standard waveform envelope"). Specifically, the generation time period calculating section 308 performs e.g. lowpass filter processing on the standard waveform data to calculate an envelope curve of the amplitude of the standard waveform data as a standard waveform envelope. It should be noted that in the case of the FM tone generator method, the envelope of standard waveform data substantially corresponds to the ADSR envelope of the carrier, and hence the ADSR envelope of the carrier may be directly used as the standard waveform envelope.

The end of the sounding time period of a musical tone, which is indicated by the standard waveform envelope generated in the above-described manner, is later than the note-off timing by the length of the release part insofar as the release rate RR of the carrier is not infinite. In the following description, the end of a sounding time period indicated by the standard waveform envelope, i.e. the end of the release part is referred to as "the sound-off timing", and data indicative of the sound-off timing is referred to as "the sound-off timing data". In the following description, it is assumed that, for example, the sound-off timing data corresponding to the note data 18 is "2:3:187".

Upon generation of the standard waveform envelope, the generation time period calculating section 308 sends the note-on timing data, sound-off timing data, and note data number of the generated standard waveform envelope to the performance data processing section 303 (step S109). Upon reception of data such as the note-on timing data, the performance data processing section 303 identifies velocity data included in the note data 18 (see FIG. 3) as volume designation data according to the received note data number as follows:

<Volume Designation Data: Velocity "58">

Also, the performance data processing section 303 identifies data whose channel number is "2", type data is the "channel volume", and timing indicated by changing timing data is "2:2:006" or prior to this and the latest among channel event data (see FIG. 4) as data indicative of the default value of channel volume corresponding to the note data 18. It should be noted that in this case, the identified channel event data has an event number "17" (hereinafter referred to as "the channel event data 17"). Then, the performance data processing section 303 identifies value data, which is included in the identified channel event data, as volume designation data as follows:

<Volume Designation Data: Channel Volume "105"(Default Value)>

Also, the performance data processing section 303 retrieves data whose channel number is "2", type data is the "channel volume", and timing indicated by changing timing data is between the note-on timing "2:2:006" and the sound-off timing "2:3:187" from the channel event data. The performance data processing section 303 identifies the retrieved channel event data as data indicative of changing information on channel volume changing information corresponding to the note data 18. It should be noted that in this case, the identified channel event data is channel event data 20. Next, the performance data processing section 303 identifies value data and changing timing data included in the identified channel event data as volume designation data as follows:

<Volume Designation Data: Channel Volume "78" (Changing Timing "2:2:240">

Then, with respect to channel event data whose type data is the "expression", the performance data processing section 303 performs the same processing as in the case where the type data of the channel event data is the "channel volume", and identifies the following data as volume designation data indicative of the default value of the expression and changing information corresponding to the note data 18. It should be noted that in this case, channel event data 12 and 22 are identified.

<Volume Designation Data: Expression "83" (Default Value)>

<Volume Designation Data: Expression "115" (Changing Timing "2:2:385">

Further, with respect to data whose type data is the "master volume" among the song event data (see FIG. 5), the performance data processing section 303 performs the same processing as the processing performed on the above-mentioned channel event data whose type data are the "channel volume" and the "expression", and identifies the following data as volume designation data indicative of the default value of master volume and changing information corresponding to the note data 18. It should be noted that in this case, the identified song event data are song event data with event numbers "6" and "7".

<Volume Designation Data: Master Volume "90"(Default Value)>

<Volume Designation Data: Master Volume "98"(Changing Timing "2:2:315">

After identifying various kinds of volume designation data in the above-described manner, the performance data processing section 303 sends the identified volume designation data as well as the note data number to the generation time period calculating section 308 (step S110). Upon reception of various kinds of volume designation data, the generation time period calculating section 308 performs volume adjustment on the previously generated standard waveform envelope according to the volume designation data. A waveform envelope obtained as a result of volume adjustment performed according to volume designation data will hereafter be referred to as "the post-adjustment waveform envelope". The following equation 1 is an example of an expression for calculating the value of the post-adjustment waveform envelope at an arbitrary time point P from the value of the standard waveform envelope at the time point P. It should be noted that the equation 1 is only an example, and other various expressions may be used.

Equation 1=(the value of the post-adjustment waveform envelope at the time point P)=(the value of the standard waveform envelope at the time pint P)×(velocity/127)×(channel volume/127)×(expression/127) ×(master volume/127)

Figure 12A:
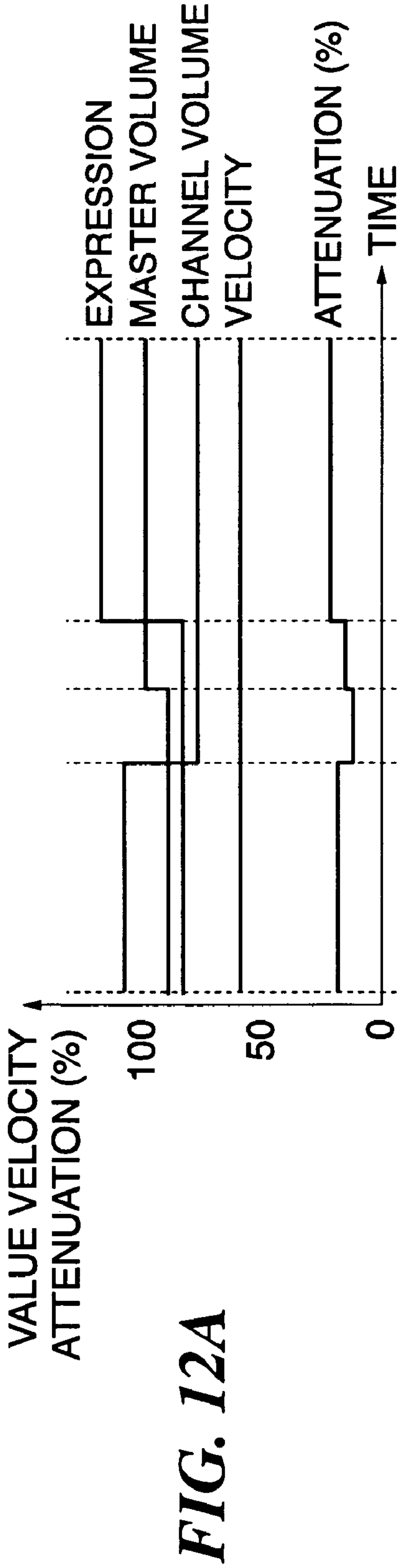
FIGS. 12A and 12B are view schematically showing the relationship between volume designation data, the rate of attenuation, a standard waveform envelope, and a post-adjustment waveform envelope in the authoring tool.
Figure 12B:
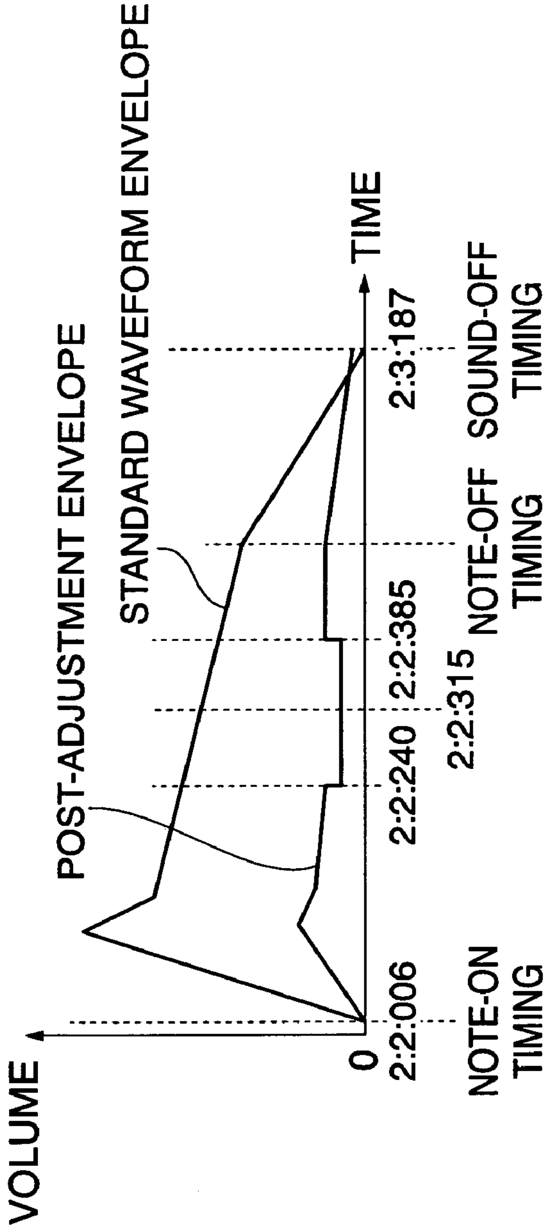

FIGS. 12A and 12B are view schematically showing the relationship between various kinds of volume designation data, a ratio by which the value of the standard waveform envelope (hereinafter referred to as "the ratio of attenuation") is multiplied, the standard waveform envelope, and the post-adjustment waveform envelope. Specifically, the generation time period calculating section 308 multiplies the value of the standard waveform envelope of a musical tone at each time point by the ratio of attenuation at the time point to generate the post-adjustment waveform envelope indicative of the waveform envelope of the musical tone on which volume adjustment has been performed. It should be noted that the generation time period calculating section 308 should not necessarily generate the post-adjustment waveform envelope from the standard waveform envelope, but may perform volume adjustment on standard waveform data according to volume designation data to generate the envelope of waveform data after the volume adjustment as the post-adjustment waveform envelope.

After generating the post-adjustment waveform envelope as mentioned above, the generation time period calculating section 308 sends the generated post-adjustment waveform envelope as well as a note data number and note-on timing data thereof to the display processing section 304 (step S111). The post-adjustment waveform envelope and the note-on timing data sent to the display processing section 304 serve as generation time period data indicative of the period of time for which a musical tone is actually sounded, i.e. generation starting timing and generation ending timing of digital audio data indicative of the musical tone sounded by the musical tone generation section 108. The display processing section 304 determines the position and length in the direction of a time axis along which an envelope or a release bar is displayed according to the received post-adjustment waveform envelope and note-on timing data. The display processing section 304 determines the position of a pitch axis along which an envelope or a release bar is displayed according to the received note data number.

After determining the display position and length as described above, the display processing section 304 causes the display section 305 to display the post-adjustment waveform envelope in the case where the previously and temporarily stored selection result (selected option) data (step S104) is the "envelope display", or to display a release bar in the case where the selection result data is the "release bar display" such that the envelope or the release bar is displayed at the-determined display position and with the determined length (step S112). As a result, as shown in FIG. 11, on the piano-roll display screen in FIG. 10, an envelope 1102*a* or a release bar 1102*b* is additionally displayed in association with the note bar 1101.

Since an envelope or a release bar is displayed by the authoring tool 10 as described above, the user can easily check the actual sounding time period of the musical tone when automatic performance is carried out according to note data indicated by the note bar 1101. Also, when an envelope is displayed by the authoring tool 10, the user can check a temporal change in the volume of the musical tone as well as the sounding time period of the musical tone.

Figure 13A:
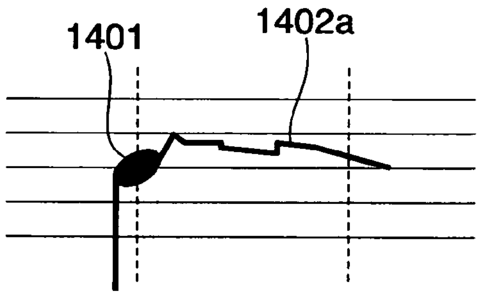
FIGS. 13A and 13B are view showing an example of the display mode of sounding time periods displayed in a staff display format in the display section of the authoring tool.
Figure 13B:
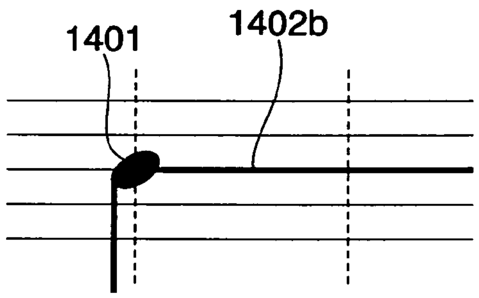

Also, in the case where the contents of performance data are displayed in the staff format, the user can cause the screen of the authoring tool 10 shown in FIG. 10 to display information relating to the actual sounding time period of a musical tone. FIGS. 13A and 13B are view showing an example of the display mode in which an envelope 1402*a* indicative of a post-adjustment waveform envelope and a release bar 1402*b* indicative of a time period of a release part of the post-adjustment waveform envelope, which have been obtained by processing of a note 1401 of note data are displayed by the authoring tool 10. It should be noted that the display format is not limited to the piano-roll format and the staff format, but any display formats may be used insofar they have a time axis along which an envelope and a release bar can be displayed. Also, in place of the release bar, information relating to the sounding time period of a musical tone may be displayed in other formats; for example, a mark indicative of sound-off timing may be displayed instead of a release bar.

Further, although in the above described embodiment, the authoring tool 10 uses waveform data generated by the FM tone generator method as the above-mentioned standard waveform data, the authoring tool 10 can also display an envelope and a release bar or the like for performance data used by an automatic performance apparatus based on any other tone generator method by using waveform data generated by the other tone generator method as the above-mentioned standard waveform data.

As described above, according to the present embodiment, the user can cause the display section to display the actual sounding time period of a musical tone to be generated according to note data as described above, and therefore, the user can easily know the number of musical tones which are to be sounded at a time at each time point during reproduction of performance data. Thus, the user can predict such a phenomenon that sounding of a musical tone is forced to be stopped due to the shortage of resources of the automatic performance apparatus during automatic performance (hereinafter referred to as "the sound interruption"), making it possible to prevent the automatic performance apparatus from carrying out unintended performance. The authoring tool 10 has also a sound interruption checking function, described below, so that the user can easily recognize the occurrence of the sound interruption.

When the user would like to check whether the sound interruption occurs or not, the user clicks a "sound interruption check" button on the screen shown in FIG. 10. In response to this user's operation, the operating section 301 sends positional data indicative of the position of the "sound interruption check" button to the performance data processing section 303 and the display processing section 304 (steps S201 and S202). According to the received positional data, the performance data processing section 303 and the display processing section 304 ascertain that they have been instructed to execute the sound interruption checking function.

When ascertaining that the performance data processing section 303 has been instructed to execute the sound interruption checking function, it performs the sequence of processing in the above described steps S105 and subsequent steps on all the note data included in the performance data (steps S104, S106, and S110). In response to the processing performed by the performance data processing section 303, also the tone color data processing section 307 and the generation time period calculating section 308 perform the above described sequence of processing on all the note data (steps S107, S108, S109, and S111). As a result, the display processing section 304 receives post-adjustment envelopes and note-on timing data as well as note data numbers with respect to all the note data included in the performance data from the generation time period calculating section 308.

In addition to the above described processing in the steps S107 and S108, the tone color data processing section 307 sends the number of operators, which are included in tone color data (see FIG. 6) corresponding to tone color designation data of each piece of note data, as well as note data numbers of respective pieces of the note data to the required resource amount calculating section 309 (step S203). Also, in addition to the above described processing in the steps S109 and S111, the generation time period calculating section 308 sends the same data as the data sent to the display processing section 304 in the step S111, i.e. post-adjustment waveform envelopes and note-on timing data as well as note data numbers of respective pieces of note data to the required resource amount calculating section 309 (step S204).

The required resource amount calculating section 309 calculates sound-off timing relating to each piece of note data according to the received post-adjustment waveform envelope and note-on timing data, and generates the calculation result as sound-off timing data. Then, the required resource amount calculating section 309 generates a data list (hereinafter referred to as "the sound interruption detecting data list") for detecting the occurrence of the sound interruption caused by the shortage of operators using the note data numbers, the note-on timing data, the sound-off timing data, and the number of operators. FIGS. 14A and 14B are view showing an example of the sound interruption detecting data list generated by the required resource amount calculating section 309. In the sound interruption detecting data list, data in each line includes a line number for identifying the data, a note data number, note-on/sound-off indicative of whether the timing is note-on timing or sound-off timing, the number of operators indicative of the number of operators to be newly used or released, timing data indicative of note-on timing or sound-off timing, a sounding note number indicative of the number of note data instructed to be sounded in timing indicated by the timing data, and the total number of operators indicative of the total number of operators required for sounding based on the note data indicated by the sounding note number. It should be noted that in the sound interruption detecting data list, data of respective lines are arranged in the order of timing from the earliest to the latest. Also, the number of operators which is not in parentheses means the number of operates to be newly used, and the number of operators which is in parentheses means the number of operators to be newly released.

The required resource amount calculating section 309 rearranges the data received from the tone color data processing section 307 and the generation time period calculating section 308 to generate data of the respective items consisting of the note data number, note-on/sound-off, the number of operators, and timing data. Then, regarding each data line in which note-on/sound-off is "note-on", the required resource amount calculating section 309 adds a note data number in the data line to a sounding note number to a data line one line above, and regarding each data line in which note-on/sound-off is "sound-off", the required resource amount calculating section 309 erases a note data number in the data line from a sounding note number in a data line one line above, so that sounding note number data for the line is generated. Also, regarding each data line in which the number of operators is not in parentheses, the required resource amount calculating section 309 adds the number of operators in the data line to the total number of operators in a data line one line above, and regarding each data line in which the number of operators is in parentheses, the required resource amount calculating section 309 subtracts the number of operators in the data line from the total number of operators in a data line one line above, so that data on the total number of operators for the line is generated. The required resource amount calculating section 309 sends the sound interruption detecting data list including the data generated as described above to the shortage time period calculating section 310 (step S205).

The shortage time period calculating section 310 temporarily stores the received sound interruption detecting data list as the original sound interruption detecting data list. Then, regarding the respective data lines, the shortage time period calculating section 310 sequentially determines whether or not the total number of operators included in the sound interruption detecting data list is larger than the maximum number of operators that can be used by the musical tone generating section 108, i.e. 16, in the direction downward from a data line with a line number "1" (hereinafter referred to as "data 1"). In the data example shown in FIGS. 14A and 14B, first, the shortage time period calculating section 310 determines that the total number of operators in data 13 is larger than 16. In this case, the shortage time period calculating section 310 identifies a note number "5" indicated first among sounding note numbers included in the data 13. The note number "5" means that sounding of a musical tone being sounded based on the note data 5 is to be stopped due to the shortage of operators. Therefore, by referring to data lines down from the data 13, the shortage time period calculating section 310 retrieves a data line whose note data number is "5" and note-on/sound-off is "sound-off". In this case, data 14 is retrieved. The shortage time period calculating section 310 creates an updated version of the sound interruption detecting data list by changing the timing data in the data 14 according to the contents of timing data included in the data 13.

The shortage time period calculating section 310 sends the updated version of the sound interruption detecting data list to the required resource amount calculating section 309 (step S206). After sorting data included in the updated version of the sound interruption detecting data list according to timing, the required resource amount calculating section 309 carries out generation of data again on the sounding note number and the total number of operators as described above, and sends an updated version of the sound interruption detecting data list which reflects the result to the shortage time period calculating section 310 (step S205). For every data line included in the updated version of the sound interruption detecting data list, the required resource amount calculating section 309 and the shortage time period calculating section 310 repeats the transfer of the sound interruption detecting data list (steps S205 and S206) and the data changing process until the total number of operators becomes equal to or smaller than 16. FIGS. 15A and 15B are view showing an example of an update version of the tone interruption detecting data list after the required resource amount calculating section 309 and the shortage time period calculating section 310 complete the data changing process. As compared with the original sound interruption detecting data list shown in FIGS. 14A and 14B, in the updated version of the sound interruption detecting data list shown in FIGS. 15A and 15B, timing data in data 14 and data 39 are changed and the total number of operators is not greater than 16 with respect to every data line.

Then, the shortage time period calculating section 310 retrieves one or more data lines in which the total number of operators is greater than 16 from the original sound interruption detecting data list, and generates shortage time period data indicative of the time period for which the number of operators is insufficient according to timing data in each retrieved data line and subsequent data lines as follows:

<Shortage Time Period Data: "1:2:247"-"1:2:432">

<Shortage Time Period Data: "2:2:251"-"2:3:152">

Further, the shortage time period calculating section 310 compares the updated version of the sound interruption detecting data list with the original sound interruption detecting data list to generate reduced time period data indicative of a note data number of note data whose sounding time period has been reduced and the reduced sounding time period as follows:

<Reduced Time Period Data: "5", "1:2:432"→"1:2:247">

<Reduced Time Period Data: "17", "2:3:168"→"2:2:251">

The shortage time period calculating section 310 sends the shortage time period data and the reduced time period data generated as described above to the display processing section 304 (step S207). It should be noted that the required resource amount calculating section 309 and the shortage time period calculating section 310 may generate shortage time period data and reduced time period data by methods other than the above described method, e.g. by setting or resetting flags corresponding to respective operators according to note-on timing and sound-off timing and counting the number of flags which are set.

Upon reception of the shortage time period data and the reduced time period data from the shortage time period calculating section 310, the display processing section 304 instructs the display processing section 305 to add a line indicative of the sounding time period to a note bar corresponding to each piece of note data (hereinafter referred to as "the sounding time period bar"), and to change the background color inside a range indicative of the time period for which the number of operators is insufficient, according to the post-adjustment waveform envelope and the note-on timing data relating to each piece of note data received from the generation time period calculating section 308 in the step S111 and the shortage time period data and the reduced time period data received from the necessary resource amount calculation section 309 (step S208). On this occasion, regarding the sounding time period bar relating to note data whose sounding time period has been reduced, the display processing section 304 instructs the display section 305 to display a part corresponding to the reduced time period in a bold stroke. As a result, the display section 305 changes the piano-roll display screen in FIG. 10 to a screen in FIG. 16.

Figure 16:
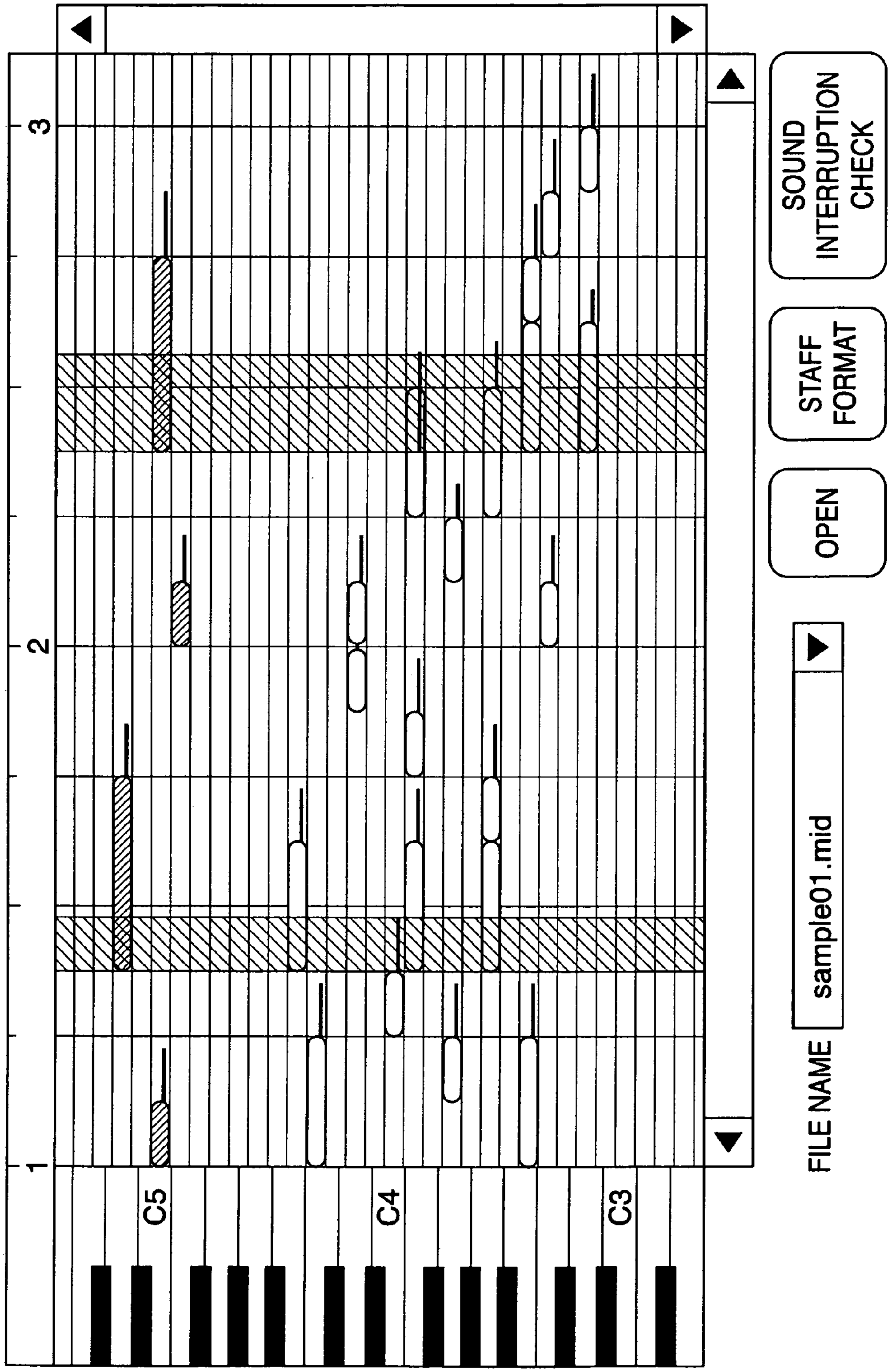
FIG. 16 is a view showing an example of a screen displayed in the display section of the authoring tool.
Figure 17:
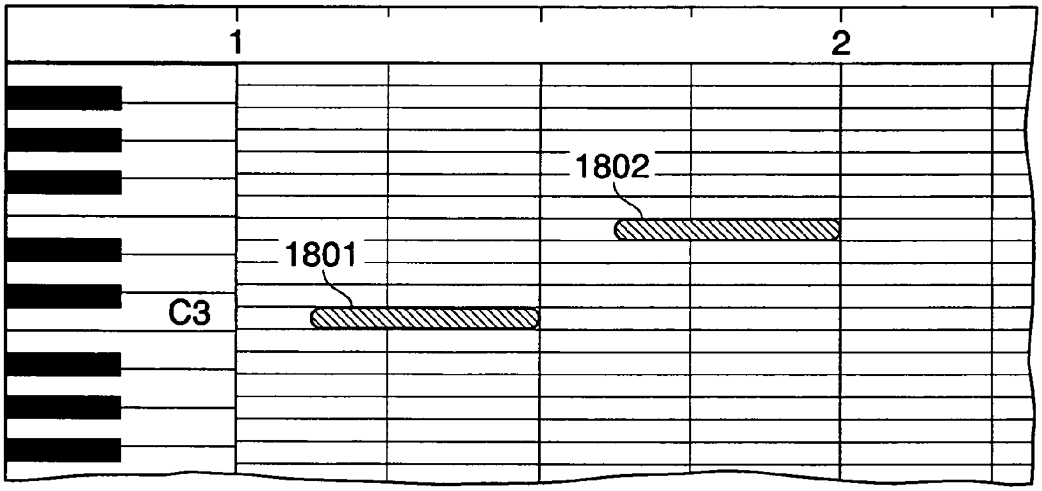
FIG. 17 is a view showing an example of a screen displayed in a display section of an authoring tool according to the prior art.

As shown in FIG. 16, the authoring tool 10 displays the time period for which the number of operators is insufficient and a part in which the sounding time period has been reduced due to the shortage of operators, and therefore, the user can easily predict the occurrence of sound interruption and find a countermeasure to solve the problem caused by the sound interruption. It is to be understood that the mode in FIG. 16 in which the time period for which the number of operators is insufficient and the reduced sounding time period are displayed is only an example, and other various display modes may be used. For example, the color of display corresponding to the shortage time period should not necessarily be changed, but the form of a note bar corresponding to a musical tone sounded in a shortage time period may be changed, or the note bar may be caused to blink. Also, an envelope or the like may be displayed instead of the sounding time period bar, and the shortage time period and the reduced time period may be displayed in other formats such as the staff format.

Further, although in the above described embodiment, the number of operators is given as an example of the amount of resources owned by the automatic performance apparatus, the authoring tool 10 may display the resource shortage time period and the reduced time period by determining whether or not insufficient resources are available, from conditions corresponding to other kinds of resources such as the total size of waveform data which can be processed and the processing speed of the DSP. Further, the number of operators required for the algorithm may be fixed at "2" (or "4"), and eight (or four) musical tones can be sounded (sounding elements) for the total number of operators 16, and the eight (or four) musical tones (sounding elements) may be used as the amount of resources.

It should be noted that as described above, the authoring tool 10 has the performance data editing function as is the case with ordinary authoring tools as well as the performance data display function; if there is a change in performance data, the authoring tool 10 carries out the above-mentioned performance data displaying process again to update the display according to the resulting performance data. Further, the authoring tool 10 has the performance data reproducing function as is the case with ordinary authoring tools; the musical tone generating section 108 can carry out automatic performance according to performance data in accordance with a reproducing instruction given from the user. Therefore, by editing performance data, the user can easily solve the problems caused by the sound interruption, and immediately check the result.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A performance information display apparatus comprising:

a performance data storage device that stores performance data including sounding designation data that designates sounding starting timing and sounding ending timing of each of musical tones constituting a musical composition;

a generation time period calculating device that calculates a generation time period of a musical tone signal indicative of each of the musical tones corresponding to the sounding designation data in the performance data to be generated by a musical tone generating device when the musical tone generating device is instructed to generate the musical tone signal; and a display device that provides first display indicative of the sounding starting timing and the sounding ending timing designated by the sounding designation data corresponding to at least one of the musical tones constituting the musical composition, and provides second display indicative of a sounding time period on and after the sounding ending timing, out of a generation time period of the musical tone signal indicative of the at least one musical tone calculated by said generation time period calculating device.

2. A performance information display apparatus according to claim 1, wherein:

the performance data further includes volume designation data that designates a temporal change in volume of each of the musical tones constituting the musical composition; and said generation time period calculating device calculates the generation time period of the musical tone signal indicative of the at least one musical tone according to the volume designation data corresponding to the at least one musical tone.

3. A performance information display apparatus according to claim 1, wherein said display device provides the second display by displaying an envelope indicative of a temporal change in volume of the at least one musical tone.

4. A performance information display apparatus according to claim 1, further comprising:

a required resource amount calculating device that calculates an amount of resources required for generating the musical tone signal indicative of each of the musical tones corresponding to the sounding designation data in the performance data based on the generation time period of the musical tone signal indicative of each of the musical tones calculated by said generation time period calculating device; and a shortage time period calculating device that calculates a time period for which the amount of resources based on the generation time period of the musical tone signal indicative of each of the musical tones calculated by said required resource amount calculating device exceeds an amount of resources owned by the musical tone generating device, as a resource shortage time period, wherein said display device displays the resource shortage time period calculated by said shortage time period calculating device.

5. A performance information display apparatus according to claim 1, wherein the generation time period of the musical tone signal calculated by said generation time period calculating device includes a generation time period of a reverberant part of a corresponding musical tone.

6. A computer-readable storage medium according to claim 1, wherein said display device provides the second display by displaying the sounding time period on and after the sounding ending timing of the at least one musical tone.

7. A performance information display apparatus comprising:

a performance data storage device that stores performance data including sounding designation data that designates sounding starting timing and sounding ending timing of each of musical tones constituting a musical composition;

a generation time period calculating device that calculates a generation time period of a musical tone signal indicative of each of the musical tones corresponding to the sounding designation data in the performance data to be generated by a musical tone generating device when the musical tone generating device is instructed to generate the musical tone signal;

a required resource amount calculating device that calculates an amount of resources required for generating the musical tone signal indicative of each of the musical tones corresponding to the sounding designation data in the performance data based on the generation time period of the musical tone signal indicative of each of the musical tones calculated by said generation time period calculating device;

a shortage time period calculating device that calculates a time period for which the amount of resources based on the generation time period of the musical tone signal indicative of each of the musical tone calculated by said required resource amount calculating device exceeds an amount of resources owed by the musical tone generating device, as a resource shortage time period; and a display device that displays the resource shortage time period calculated by said shortage time period calculating device.

8. A performance information display apparatus according to claim 7, wherein the musical tone generating device comprises a musical tone generating device based on an FM tone generator method, and the resources are operators comprising the musical tone generating device based on the FM tone generator method.

9. A computer-readable storage medium storing a computer program, the computer program comprising:

a performance data storage module for storing performance data including sounding designation data that designates sounding starting timing and sounding ending timing of each of musical tones constituting a musical composition;

a generation time period calculating module for calculating a generation time period of a musical tone signal indicative of each of the musical tones corresponding to the sounding designation data in the performance data to be generated by a musical tone generating device when the musical tone generating device is instructed to generate the musical tone signal; and a display module for providing first display indicative of the sounding starting timing and the sounding ending timing designated by the sounding designation data corresponding to at least one of the musical tones constituting the musical composition, and providing second display indicative of a sounding time period on and after the sounding ending timing, out of a generation time period of the musical tone signal indicative of the at least one musical tone calculated by said generation time period calculating module.

10. A computer-readable storage medium storing a computer program, the computer program comprising:

a performance data storage module for storing performance data including sounding designation data that designates sounding starting timing and sounding ending timing of each of musical tones constituting a musical composition;

a generation time period calculating module for calculating a generation time period of a musical tone signal indicative of each of the musical tones corresponding to the sounding designation data in the performance data to be generated by a musical tone generating device when the musical tone generating device is instructed to generate the musical tone signal;

a required resource amount calculating module for calculating an amount of resources required for generating the musical tone signal indicative of each of the musical tones corresponding to the sounding designation data in the performance data based on the generation time period of the musical tone signal indicative of each of the musical tones calculated by said generation time period calculating module;

a shortage time period calculating module for calculating a time period for which the amount of resources based on the generation time period of the musical tone signal indicative of each of the musical tone calculated by said required resource amount calculating module exceeds an amount of resources owed by the musical tone generating device, as a resource shortage time period; and a display module for displaying the resource shortage time period calculated by said shortage time period calculating module.

* * * * *